United States Patent
Goellner

[15] 3,656,393
[45] Apr. 18, 1972

[54] CARBIDE SAW BLADE LOCKING DEVICE

[72] Inventor: Willy J. Goellner, Rockford, Ill.

[73] Assignee: Paramount Textile Machinery Co., Chicago, Ill.

[22] Filed: June 19, 1970

[21] Appl. No.: 47,830

[52] U.S. Cl. .................................83/666, 29/464, 51/168, 83/698, 143/155 R
[51] Int. Cl. ...........................................................B26d 1/28
[58] Field of Search ..............83/665, 666, 676, 698; 30/329, 30/337, 334; 51/168; 143/155 R, 155 A, 155 B, 155 C, 155 D

[56] References Cited
UNITED STATES PATENTS 2,846,826  8/1958  Miller .........................................51/168
2,920,894  1/1960  Kreinick ..................................51/168 X

*Primary Examiner*—Frank T. Yost
*Attorney*—Burns, Doane, Swecker & Mathis

[57] ABSTRACT

A method and apparatus for driving a saw blade and for positively locking the saw blade to the nose of a spindle which will minimize backlash between the blade and spindle. Further, a method and apparatus for locking a saw blade to a driving spindle which will permit rapid replacement of a defective or worn cutting tool. A driving spindle is provided with at least one driving and locking pin having a cam nose which is designed to engage the inner periphery of an aperture in a saw blade and positively lock the saw blade to the driving spindle.

16 Claims, 3 Drawing Figures

PATENTED APR 18 1972

3,656,393

INVENTOR
WILLY J. GOELLNER

BY Burns, Doane, Benedict,
Swecker & Mathis

ATTORNEYS

CARBIDE SAW BLADE LOCKING DEVICE

BACKGROUND OF THE INVENTION

This invention relates to cutting mechanisms and a method and apparatus for connecting a cutting tool to a driving means in such a manner as to prevent movement therebetween, while simultaneously permitting easy replacement of a worn or defective tool.

More particularly, this invention relates to a high speed circular saw having carbide tips thereon and a method and apparatus for driving the saw blade and positively locking the saw blade to a driving spindle.

In the past most circular saw blades were manufactured from high speed or high carbon steel and were not subject to critical problems associated with backlash. Therefore, in most existing machines the saw blades were mounted on the nose of a driving spindle by means of a single large machine bolt positioned in the center of the spindle or a plurality of machine bolts spaced peripherally around the axis of the spindle.

The holes in the saw blade were machined to conform with corresponding apertures in the driving spindle. However, some amount of play between corresponding parts always was present. In some instances this play was as much as plus or minus one thirty-second of an inch.

It will be appreciated therefore that as a cutting tool was brought into contact with a workpiece the cutting tool would momentarily decrease in rotational speed with respect to the driving spindle until the slack in the connection was taken up. An instant later an impact load was created on the cutting tool as the rotational speed of the tool was instantaneously brought up to the speed of the spindle.

With a grinding implement this impact or shock load occurs only as the tool initially engages the workpiece. However, with toothed cutting blades it has been found that vibrations are established in the spindle and blades, due to the play in the mounting, as each discrete tooth impacts the workpiece. In some instances these vibrations would reach harmonic proportions which damage the cutting tool or driving spindle or both. As a practical matter, however, most high carbon steel could adequately absorb a considerable amount of shock load and thus a reasonable amount of play in the blade mountings was tolerable.

With the advent of carbide tools, however, it has been found that play in the cutting tool drive system produces a serious backlash problem which rapidly causes the teeth of the tools to crack, chip or break off completely.

To alleviate this problem great care has been taken to make the gearing in the spindle itself backlash free. However, it would be desirable to be able to positively lock a saw blade to the nose of a driving spindle and thus further minimize backlash and tooth breakage.

Further, in the past, as previously mentioned, a cutting blade has been frequently mounted to a driving spindle by a plurality of machine bolts. Therefore in order to replace a defective or worn blade it was necessary to completely remove all of these bolts before the old blade could be removed and the new one installed. This procedure was troublesome and time consuming. It would thus be desirable to be able to positively lock a cutting blade to a driving spindle with a minimum amount of time and effort spent.

OBJECTS AND SUMMARY OF THE INVENTION

It is therefore a general object of the invention to provide a method and apparatus which eliminates or minimizes problems of the type previously noted.

It is a particular object of the invention to provide a method and apparatus which minimizes circular saw blade failure.

It is another object of the invention to provide a method and apparatus which eliminates or minimizes relative movement of backlash between a saw blade and a driving spindle.

It is yet another object of the invention to provide a method and apparatus for positively locking a circular saw blade to a driving spindle.

It is a further object of the invention to provide a method and apparatus for mounting a circular saw to a driving spindle which will facilitate easy removal and replacement of a defective blade.

It is a still further object of the invention to provide a cam locking device which will exhibit a high degree of durability and wear free service.

It is a related object of the invention to provide a method and apparatus to firmly, axially lock a saw blade to a driving spindle.

A preferred embodiment of the invention intended to accomplish at least some of the foregoing objects involves a carbide tipped circular saw blade having a central hole therethrough and a plurality of locking apertures circumferentially spaced therearound. The saw is designed to be positively locked in a driving posture upon a driving machine spindle nose. The spindle nose is provided with cylindrical recesses corresponding with the apertures in the saw blade but having the axes thereof radially offset from the axes of the saw blade apertures. The recesses in the spindle nose are designed to receive in contiguous engagement a driving and locking pin. The pin includes a cylindrical body portion receivable within the spindle recesses and a cam nose which has an axis offset from the axis of the body for engagement with an aperture in the saw blade.

In locking the saw to the spindle in a driving anti-backlash fashion, the saw is mounted over an accurately formed pilot hole in the spindle nose. Two or more driving and locking pins are located around the periphery of the spindle nose. These pins have eccentric locking head portions or cams, as previously mentioned. One of the eccentric pins is then turned until it locks the blade against the pilot diameter. The second eccentric pin is then turned until it also positively locks the blade in a driving anti-backlash manner. The use of these eccentric driving pins permanently located in the nose of the spindle facilitates quick changing of the blade and minimizes the possibility of blade breakage due to excessive backlash caused by play in the blade mounting system.

THE DRAWINGS

Other objects and advantages of the present invention will become apparent from the following detailed description of a preferred embodiment of the invention, as illustrated in the accompanying drawings wherein.

DETAILED DESCRIPTION

Figure 1:
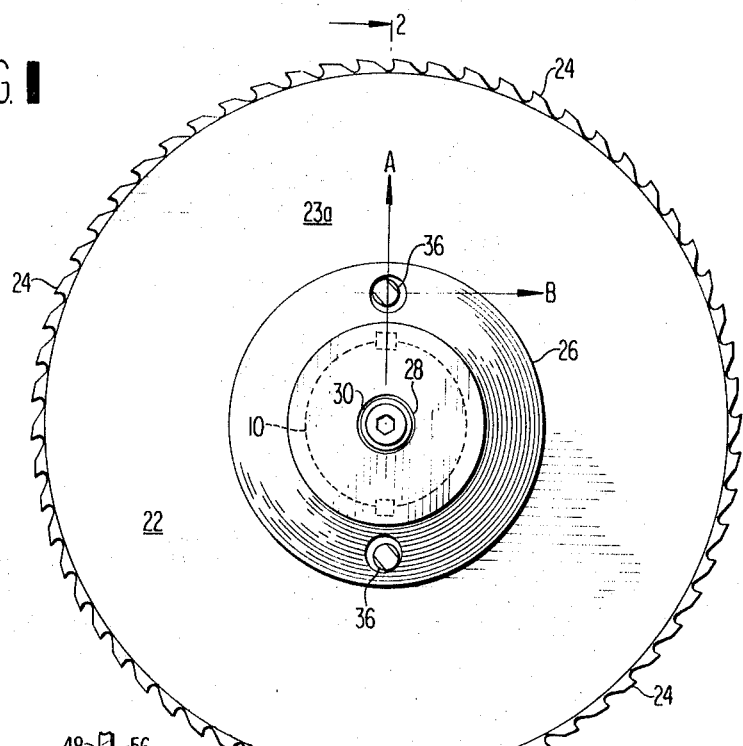
FIG. 1 is a front elevational view of a circular saw blade mounted on a driving spindle according to the present invention.

Referring now to the drawings wherein like numerals refer to like parts there is shown in FIG. 1 a circular saw blade mounting according to a preferred embodiment of the present invention.

A saw blade 22 having carbide teeth 24 is shown mounted to a driving spindle 10 by a pair of driving and locking pins 36.

Figure 2:
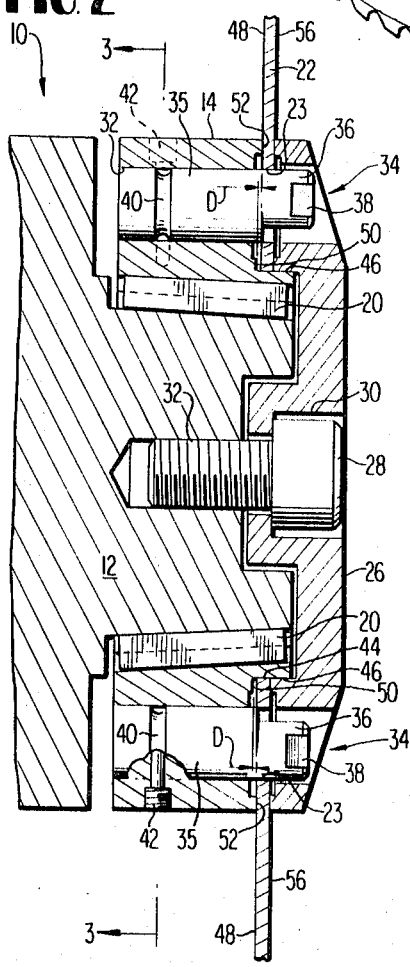
FIG. 2 is a partially cross sectional view taken along section line 2—2 of FIG. 1 showing the details of the spindle mounting.

In FIG. 2 a circular saw driving spindle 10 is illustrated. This spindle 10 may be connected to a conventional power source (not shown) which will serve to impart rotational movement thereto. The spindle 10 is provided with a generally cylindrical extension or spindle nose 12.

Figure 3:
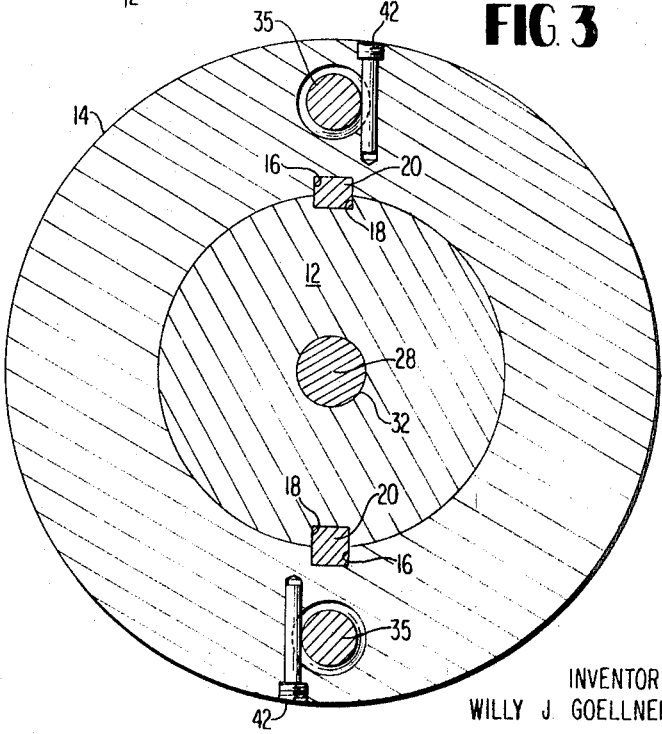
FIG. 3 is a sectional view taken along the section line 3—3 in FIG. 2.

Receivable on the spindle nose 12 is a saw blade adapter 14 which is provided with a pair of channels 16 which are located approximately diametrically opposite from each other and extend generally in the direction of the axis of the spindle. Recesses 18 complementary to the channels 16 are fashioned axially into the spindle nose 12. A pair of tapered locking keys 20 are adapted to be interferingly received within the channels 16 and recesses 18, as best seen in FIGS. 2 and 3, thus effectively coupling the saw adapter 14 to the spindle nose 12 in rigid engagement.

A saw blade 22 having carbide tips, as best seen in FIG. 1, may be axially mounted to the adapter 14 by a saw retainer 26. The retainer is held in a covering position over the end of the spindle nose 12 by a single machine bolt 28. The machine bolt passes through a pilot hole 30 in the saw retainer and is threadedly received within a cylindrical recess 32 fashioned coaxially into the spindle nose 12.

The saw blade 22 may be fashioned with a large central bore 44 which is designed to intimately engage with an offset annular shoulder or facing 46 in the saw adapter 14. The inner face 48 of the saw blade 22 axially abuts against two projecting ridges or rims 50 and 52 formed in the radially projecting face of the saw adapter 14. The outer abutment rim 52 is axially extended with respect to the inner abutment rim 50 as best seen in FIG. 2 and as represented by the dimension D. This offset need not be great, and typically may be approximately .001 of an inch. Thus it will be seen that as the saw blade 22 is axially pushed into position by the takeup of the machine bolt 28, contact will first be made with the outer peripheral abutting rim 52 with a slight axial space for a bending moment to be established between the rims 52 and 50. The blade is thereby firmly locked into axial engagement with the blade adapter.

Referring again particularly to FIG. 2, it will be seen that the saw adapter 14 is provided with a pair of diametrically opposed cylindrical recesses 32 longitudinally fashioned therethrough. Contiguously receivable within the saw adapter recesses 32 are a pair of driving and locking pins 34.

Each driving and locking pin 34 is composed of a generally cylindrical body portion 35 and an eccentric head portion 36. The head 36 may be provided with a pair of wrench flats 38 to facilitate rotation thereof. Approximately midway in the body portion 35 of each driving and locking pin 34 is a peripheral channel 40 which is suitable for the reception of the shank portion of a machine bolt 42, extending radially into the saw adapter 14. This channel and machine screw combination retains the driving and locking pins in an axially fixed relationship with respect to the saw adapter.

The locking pin nose 36 preferably has a diameter substantially equal to but slightly less than the diameter of the peripheral apertures 23 formed in the saw blades. It will be recognized that as the head diameter approaches the peripheral aperture diameter the amount of rotation necessary to effect a positive locking engagement with the aperture in the saw blade is materially decreased and a greater surface is available for potential contact with the peripheral interior of the aperture. Further, the axes of the apertures 23 and the axes of the cylindrical head 36 may be coaxial or radially displaced from one another, but both must be, in order to accomplish the camming lock, offset from the axis of the body 35 of the driving and locking pin 34 and the axes of the cylindrical recess 32 formed in the saw adapter 14. The above noted requirements will be readily appreciated by those skilled in the art. If the axis of the nose is axially aligned with the axis of the body, rotation of the body will not produce the desired cam effect. Further, if the axis of the aperture in the saw blade is aligned with the axis of the body 35, then the cam nose 36 will either be too large to fit into the blade aperture or it will not make a locking contact with the inner periphery of the blade aperture.

In order to assemble in a positive driving and anti-backlash fashion the carbide tipped saw blade 22 with the driving spindle 10, the bore 44 of the saw blade is axially disposed over the peripheral facing 46 of the saw adapter 14. The peripheral apertures 23 in the saw blade may be simultaneously slipped over the head portions 36 of the driving and locking pins 34, or the pins may be subsequently inserted into the apertures. One of the eccentric driving and locking pins may then be rotated by a conventional locking tool engaged with the wrench flats 38 until the locking head 36 is cammed into intimate driving and locking engagement with an outer peripheral portion of the saw blade aperture 23. The second eccentric driving and locking pin is then turned until it positively locks with the inner periphery of a diametrically remote aperture 23 of the saw blade 22. Thus the saw blade 22 is completely locked against potential relative rotational movement with the saw adapter 14, because any tendency for relative rotation therebetween merely induces a more positive camming lock.

Referring to FIG. 1 it will be seen that a radial line A has been sketched intersecting the central axis of the saw blade 22 and the axis of the upper peripheral aperture 23 in the saw blade. A second line B is drawn normally to the line A and also intersects the axis of the upper peripheral aperture 23. If line A is considered an ordinate and line B an abscissa it will be appreciated by those skilled in the art that the locus of potential contact points between the cam head 36 and the aperture 23 in the blade should preferably lie approximately within the second quadrant 23a in order to provide the proper locking function. In this position any clockwise rotational tendency imparted to the blade 22 which would normally induce backlash will merely tend to lock the blade more tightly to the driving spindle by increasing contact pressure between the cam nose and the aperture in the saw blade.

Finally, the saw retainer 26 is axially positioned against the spindle nose and drawn into abutting posture at its periphery with the outward face 56 of the saw blade. The blade is thus locked in fixed axial and rotational relation with respect to the saw blade adapter 14.

SUMMARY OF ADVANTAGES

It will be seen that the present invention comprises an improved method and apparatus of positively locking and driving a circular carbide tipped saw blade. In this connection, the eccentric cams provide a positive lock against potential rotational backlash or vibration, thus preventing chipping, cracking and tooth breakage of carbide tools.

It will also be appreciated by those skilled in the art that the time for mounting a new blade and dismounting a defective one will be minimal.

Further advantages are provided by a cam nose having a diameter approximately equal to the diameter of the blade aperture. This presents a greater peripheral surface for potential contact and therefore wear characteristics of the lock are enhanced.

Moreover, abutment of the saw blade by an outer peripheral rim before engagement of the blade with an inner rim provides an advantageous positive axial lock and minimizes the possibility of blade canting with respect to its desired plane of rotation.

It is apparent that although the invention has been described in connection with one preferred embodiment and method, additions, modifications, substitutions and deletions, such as those mentioned above, as well as others not specifically described, may be made therein without departing from the spirit or scope of the following claims.

What is claimed is:

1. A driven anti-backlash assembly for positively driving a circular saw blade having a plurality of apertures therethrough adjacent the central portion thereof, wherein said anti-backlash assembly comprises:

a driven spindle means for driving said saw blade and having at least a first recess therein with an axis offset from an axis of one of said apertures of said circular saw blade being driven by said spindle means; and at least a first driving and locking pin means receivable within said recess of said spindle means, said pin means having an elongate body member coaxially received within said recess of said spindle means, and an offset cam nose having an axis radially offset with respect to the axis of said body member for locking said saw body against potential backlash with respect to said spindle means.

2. A driven anti-backlash assembly as defined in claim 1 wherein said pin means comprises:

a generally cylindrical body member coaxially received within said recesses of said spindle means and, said offset cam nose being integral with said body member.

3. A driven anti-backlash assembly as defined in claim 1 and further including:

at least a second recess in said spindle means, and
at least a second driving and locking pin means receivable in said second recess of said spindle means for supplementing the driving and locking function of said first pin means.

4. A driven anti-backlash assembly as defined in claim 3 wherein:
said at least second recess and said at least second driving and locking pin means are located on a substantially diametrically opposite portion of said driven anti-backlash assembly from said at least one driving and locking pin means.

5. A drive anti-backlash assembly comprising:
a circular saw blade having a plurality of apertures therethrough positioned about a central portion of said saw blade;
a driven spindle means for driving said saw blade and having at least one recess therein, said recess having an axis offset from the axis of one of said saw blade apertures; and
at least one driving and locking pin means having a body member coaxially receivable within said recess of said spindle means and further having a cam nose axially offset with respect to the axis of said body member for rotationally driving said saw blade and for locking said saw blade against potential backlash with respect to said spindle means.

6. A driven anti-backlash assembly for positively driving a circular saw blade having a plurality of apertures therethrough formed adjacent the central portion thereof, wherein said anti-backlash assembly comprises:
a rotatable spindle nose;
a saw adapter concentrically mounted on an end portion of said spindle nose and providing a first abutting surface to prevent movement of a saw blade axially thereof, and having a plurality of apertures therethrough around the periphery thereof;
a saw retainer connected to said spindle nose and having a concentric axis with said adapter for axially locking a saw blade against said saw adapter; and
at least a first driving and locking pin having,
a cylindrical base coaxially received in intimate, rotatable contact with one of said apertures of said saw adapter, and
a cam nose having an axis radially offset with respect to the axis of said cylindrical base for driving and locking engagement with the inner peripheral surface of an aperture in said saw blade wherein the axis of said saw blade aperture is offset from the axis of said cylindrical base.

7. A driven anti-backlash assembly as defined in claim 6 and further:
at least a second driving and locking pin having
a cylindrical base coaxially received in intimate, rotatable contact with another of said apertures of said saw adapter, and
a cam nose having an axis radially offset with respect to the axis of said base for driving and locking engagement with the inner peripheral surface of said another aperture in said saw blade wherein the axis of said another saw blade aperture is also offset from the axis of said base.

8. A driven anti-backlash assembly as defined in claim 7 wherein:
said at least second driving and locking pin is located on a substantially diametrically opposite portion of said driven anti-backlash assembly from said at least first driving and locking pin.

9. A driven anti-backlash assembly as defined in claim 6 wherein:
said cam nose is generally circular in cross section having a diameter which is slightly smaller than but approximately equal to the diameter of such aperture in said saw blade being driven by said anti-backlash assembly.

10. A driven anti-backlash assembly as defined in claim 6 wherein said first abutting surface comprises:
a peripheral rim axially facing and formed radially outwardly of said plurality of said saw adapter apertures.

11. A driven anti-backlash assembly as defined in claim 10 and further comprising:
a second axially facing peripheral rim formed on said saw adapter radially inwardly of said plurality of saw adapter apertures,
said second abutting rim being axially recessed with respect to said first abutting rim whereby said saw retainer will force a saw blade into axial abutment with said first abutting surface prior to abutment with said second abutting surface.

12. A driven anti-backlash assembly as defined in claim 6 wherein:
said base of said driving and locking pin is provided with a circumferential groove, and
said adapter is provided with a machine bolt whereby said driving and locking pin may be axially retained within the aperture of said saw adapter by positive engagement of said adapter bolt in said circumferential driving and locking pin groove.

13. A method for positively locking against backlash a saw blade to a driving spindle comprising the steps of:
axially positioning a saw blade onto a driving spindle;
engaging the inner periphery of an aperture in the saw blade with a pin connected to the driving spindle; and
rotating at least one driving and locking pin having an axially offset cam nose until the nose locks the inner periphery of an aperture in the saw blade.

14. A method as defined in claim 13 and further comprising the step of:
axially connecting a cover to said driving spindle to axially retain said saw blade with respect to said driving spindle.

15. A driven anti-backlash assembly for positively driving a circular saw blade having a plurality of apertures therethrough adjacent the central portion thereof, wherein said anti-backlash assembly comprises:
a driven spindle means for driving said saw blade and having a plurality of recesses therein;
at least a first driving and locking pin means receivable within one of said plurality of recesses of said spindle means, said one of said plurality of recesses of said spindle means having an axis offset from the axes of said plurality of apertures of said saw blade, said at least a first driving and locking pin means having an axially offset cam nose for locking said saw blade against potential backlash with respect to said spindle means and for partially rotationally driving said saw blade; and
a second pin means receivable within another of said plurality of recesses of said spindle means for driving engagement with said saw blade.

16. A driven anti-backlash assembly comprising:
a circular saw blade having a plurality of apertures therethrough positioned about a central portion of said saw blade;
a driven spindle means for driving said saw blade having a plurality of recesses therein;
at least a first driving and locking pin means receivable within one of said plurality of recesses of said driven spindle means, said one of said plurality of recesses of said driven spindle means having an axis offset with respect to the axes of said plurality of apertures of said saw blade, said at least a first driving and locking pin means having an axially offset cam nose for locking said saw blade against potential backlash with respect to said driven spindle means and for partially rotationally driving said saw blade; and a second pin means receivable within another of said plurality of recesses of said driven spindle means for driving engagement with said saw blade.

* * * * *